FIG. I.

INVENTORS:
LYLE H. LEE,
RICHARD B. MULVANY,
ROBERT C. TRESEDER,

BY Hamann and Lane
ATTORNEYS.

INVENTORS:
LYLE H. LEE,
RICHARD B. MULVANY,
ROBERT C. TRESEDER,

BY Hansen and Lane
ATTORNEYS.

INVENTORS:
LYLE H. LEE,
RICHARD B. MULVANY,
ROBERT C. TRESEDER,
BY Hansen and Lane
ATTORNEYS.

May 24, 1966 L. H. LEE ETAL 3,253,263

CODE TO VOICE INQUIRY SYSTEM AND TWO-SPEED MULTI-UNIT BUFFER MECHANISM

Filed April 10, 1961 5 Sheets-Sheet 4

INVENTORS:
LYLE H. LEE,
RICHARD B. MULVANY,
ROBERT C. TRESEDER,

BY Hansen and Lane
ATTORNEYS.

INVENTORS:
LYLE H LEE,
RICHARD B. MULVANY,
ROBERT C. TRESEDER,
BY Hansen and Lane
ATTORNEYS.

United States Patent Office 3,253,263
Patented May 24, 1966

3,253,263

CODE TO VOICE INQUIRY SYSTEM AND TWO-SPEED MULTI-UNIT BUFFER MECHANISM

Lyle H. Lee, Richard B. Mulvany, and Robert C. Treseder, San Jose, Calif., assignors to International Business Machines Corporation, New York, N.Y., a corporation of New York Filed Apr. 10, 1961, Ser. No. 101,808
5 Claims. (Cl. 340—172.5)

The present invention relates to an information system and to a two-speed buffer mechanism therefor, and pertains more particularly to such a system wherein, upon the receipt of a coded inquiry from any one of a number of different inquiry stations, a constantly up-dated data processing mechanism is thereby triggered to compose from a high speed vocabulary mechanism, an answer to such inquiry in the form of a relatively short, voice type message, which message is recorded on a selected unit of a multi-unit, buffer recording mechanism at a speed several times that at which such message would be intelligible, after which the buffer unit is slowed, and the message is transmitted therefrom in intelligible, voice form, back to the point of inquiry.

In many instances, for example, in the sale of stocks and bonds, railway freight operations, and foreign exchange transactions to name but a few, it is necessary for many persons located at different, and frequently widely separated points, to have rapid access to selected items of a large amount of constantly up-to-date information pertinent to such operations. For example, it is important for a stock broker to have rapid access to current bid, asked and sale quotations on various securities being traded, and in many instances he may require additional historical or other special information pertaining to such securities for selected periods in the past.

Currently some 1500 securities are listed on the New York Stock Exchange, and approximately 1000 on the American Stock Exchange. There are at present approximately 2600 stock exchange member's officers located in some 600 cities in the United States, and these offices have some 2500 non-members correspondents. These various stock exchanges and their members and correspondents are interconnected by some 500,000 miles of telephone and telegraph lines. Aside from the well known ticker tape service, the most common ways of securing information concerning securities from the New York Stock Exchange by brokers and their correspondents are by telephone inquiry from a human operator and from a pre-recorded message on a magnetic coated drum.

The present invention will be described in connection with a system for supplying stock market information to brokers and other subscribers, although it will be understood by those familiar with the art that the system may be readily employed, or adapted by a designer of ordinary ability, to supply numerous other forms of information.

The invention provides an information system comprising a data processing mechanism, with one or more data input encoding mechanisms connected to supply the data processing mechanism with coded, current information concerning the numerous items which the system is designed to cover. Several coded inquiry or interrogating mechanisms, which may be located at widely separated points, are also operatively connected to the data processing mechanism. A high speed vocabulary mechanism is also provided which is responsive to coded impulses from the data processing mechanism in response to a coded inquiry from any one of the inquiry mechanisms for composing a vocal type message in answer to such inquiry, and simultaneously recording such answer to high speed on a selected unit of a multi-unit, two-speed, buffer recording mechanism while such unit is moving at its higher rate of speed, after which such unit is slowed to its slower rate of speed and the message thus recorded thereon is transmitted therefrom in intelligible, voice form, back to the source of the inquiry.

The invention also provides, in a vocally responsive information system, vocabulary means having a vocabulary of words and symbols recorded on individual sound tracks thereof and scanned by individual transducers at a speed greater than that at which words are aurally understandable, and a two speed buffer recording mechanism whereon the words and symbols thus picked up are recorded at the same high speed, after which the buffer mechanism is slowed for operative scanning by a separate pick-up transducer at an aurally understandable speed.

Another object of the invention is to provide, in an improved, high speed information system wherein stored, coded information having audio significance is used to compose a message from a vocabulary mechanism having audio type recordings thereon, but operating at a speed several times that at which such recordings would be aurally understandable, a multi-unit buffer recording mechanism, each unit of which comprises a two speed recording medium adapted to have recorded thereon at its higher speed, a message composed from audio type recordings of the vocabulary mechanism, and then at its lower speed to have such message transmitted therefrom in aurally understandable form.

A further object of the invention is to provide an information system adapted to compose, by means of coded data supplied from a large number of coded records which are maintained in constantly up-dated condition, relatively short, audio type answer messages from a recorder vocabulary and in response to a high rate of inquiry.

The foregoing and other objects, features and advantages of the invention will be apparent from the following more particular description of preferred embodiments of the invention, as illustrated in the accompanying drawings.

Figures 12, 13:
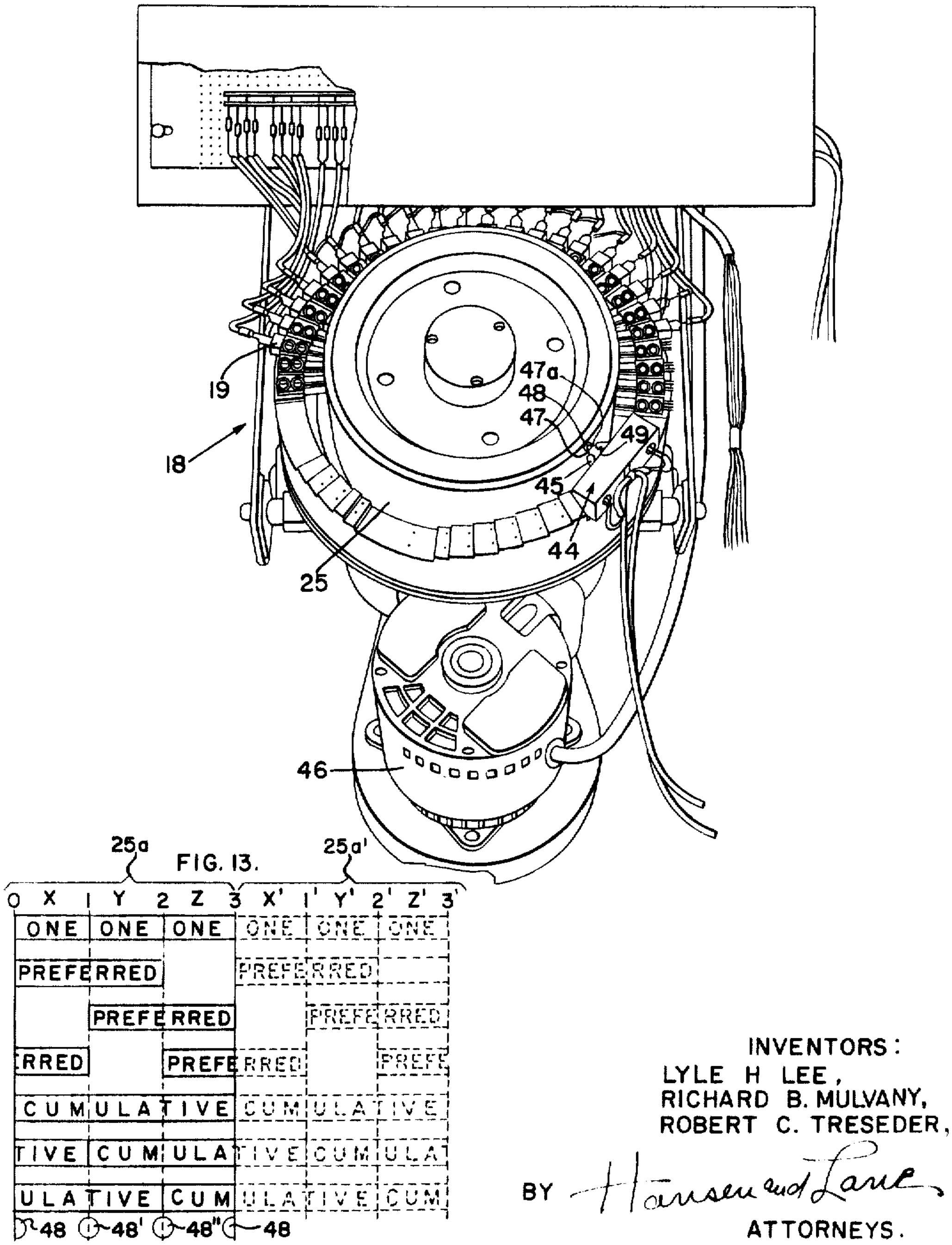
FIG. 12 is a fragmentary, perspective view of portions of a recording drum and associated transducers of the illustrated form of vocabulary mechanism.

FIG. 13 is a diagrammatic view of the unrolled or developed recording surface of portion of a vocabulary recording drum arranged for composing a message with words of different lengths, and without intermediate pauses or gaps between words, the solid line portion at the left of the figure representing the recording surface with words of different lengths recorded thereon, the broken line portion at the right representing a succeeding rotative cycle of the recording surface.

Figure 1:
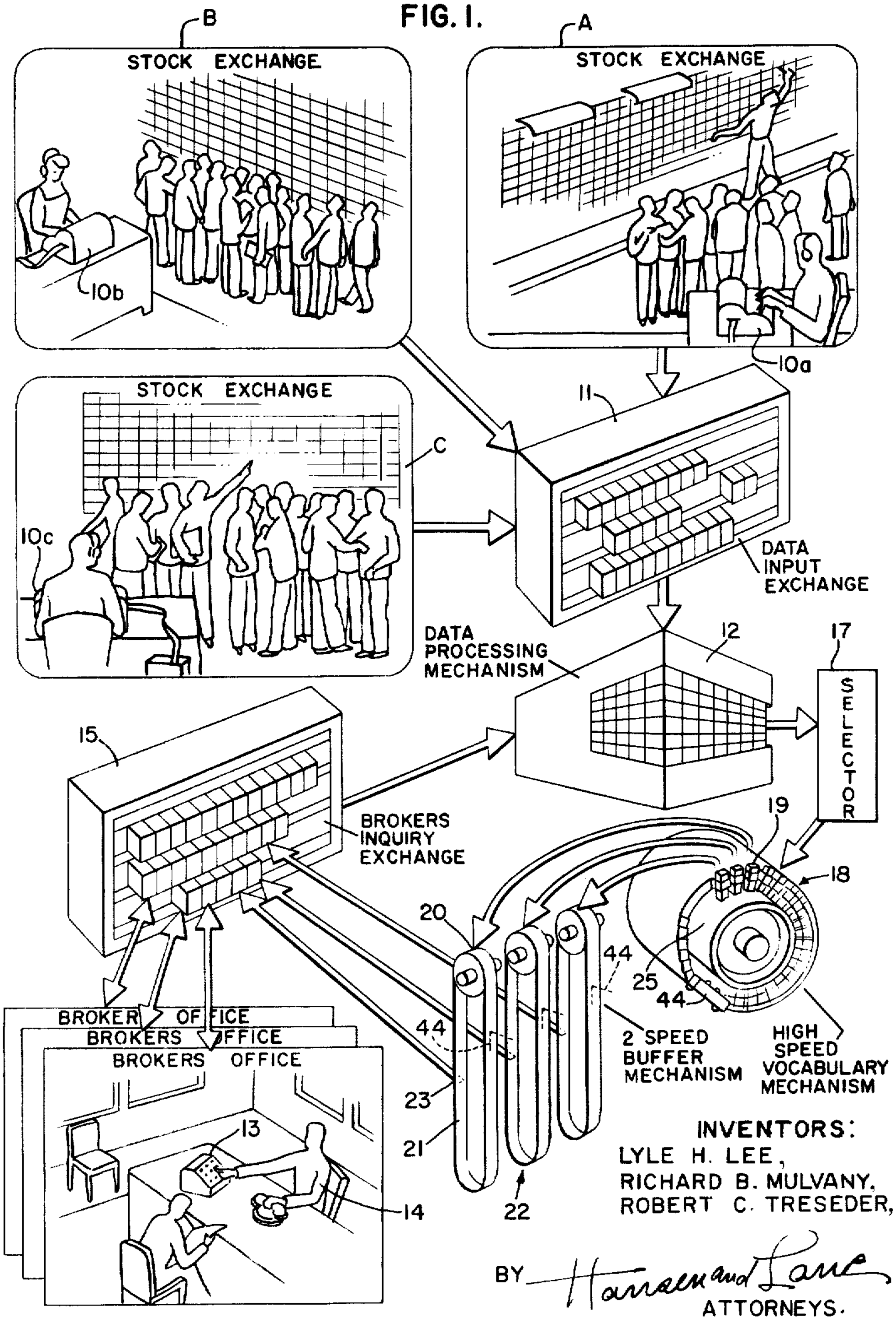
FIG. 1 is a diagrammatic illustration of various components of an illustrative embodiment of the invention and suitable for use as a stock broker's information system.

Briefly, the illustrative embodiment of the invention comprises a system, one form of which is shown diagrammatically in FIG. 1, for supplying stock market quotations and other listed information to brokers and other subscribers, and including a two speed buffer mechanism which provides for an extremely high rate of inquiry.

In the form of the invention shown in FIG. 1, one or any required plurality of data input encoding mechanisms, for example, the mechanisms 10*a*, 10*b* and 10*c* transmit coded data concerning stock market transactions as they occur, through a conventional data input exchange 11, to a data processing mechanism 12. The latter is thus constantly up-dated with information concerning the latest stock market transactions pertaining to the listed securities or other information which the system may be designed to handle.

One or more inquiry encoding mechanisms 13 are provided in the office of each broker or other subscriber to the system for sending coded impulses to the data processing mechanism 12 for triggering required information stored therein.

When a subscriber, for example broker 14, desires information concerning a listed security, he operates his inquiry encoding mechanism 13 to transmit a desired coded inquiry pertaining to such security. This coded inquiry is transmitted by conventional telephone apparatus and wiring through a broker's inquiry exchange 15 of a conventional type to the data processing mechanism 12. Each coded inquiry thus fed into the data processing mechanism 12 causes the latter, in a well known manner, to supply the coded data required to compose an answer to such inquiry.

This coded answer data is transmitted from the data processing mechanism 12 through a well known type of selector mechanism 17 to a vocabulary mechanism 18. The latter (FIGS. 1 and 13) has an individual, audio type element of the system's vocabulary, such as a word or symbol, recorded thereon in each of a large plurality of sound tracks, each of which tracks is defined by, and recurrently scanned by, an associated transducer 19. For example, one of said tracks may have the word "one" recorded thereon, another track may have the word "preferred," another "cumulative," another "latest sale," another the letter "X," and another "Z," and so on. The entire recorded vocabulary comprises all words, symbols and other elements required to compose the required answer to any inquiry which the system is capable of handling.

During use the vocabulary mechanism 18 is operated at high speed, so that each sound track thereof moves relatively to its associated transducer 19 at a speed which, for the purpose of the present description, is assumed to be fifty times that at which the vocabulary elements recorded on these tracks were originally spoken. At this speed of course none of the vocabulary elements is aurally understandable.

Figure 9:
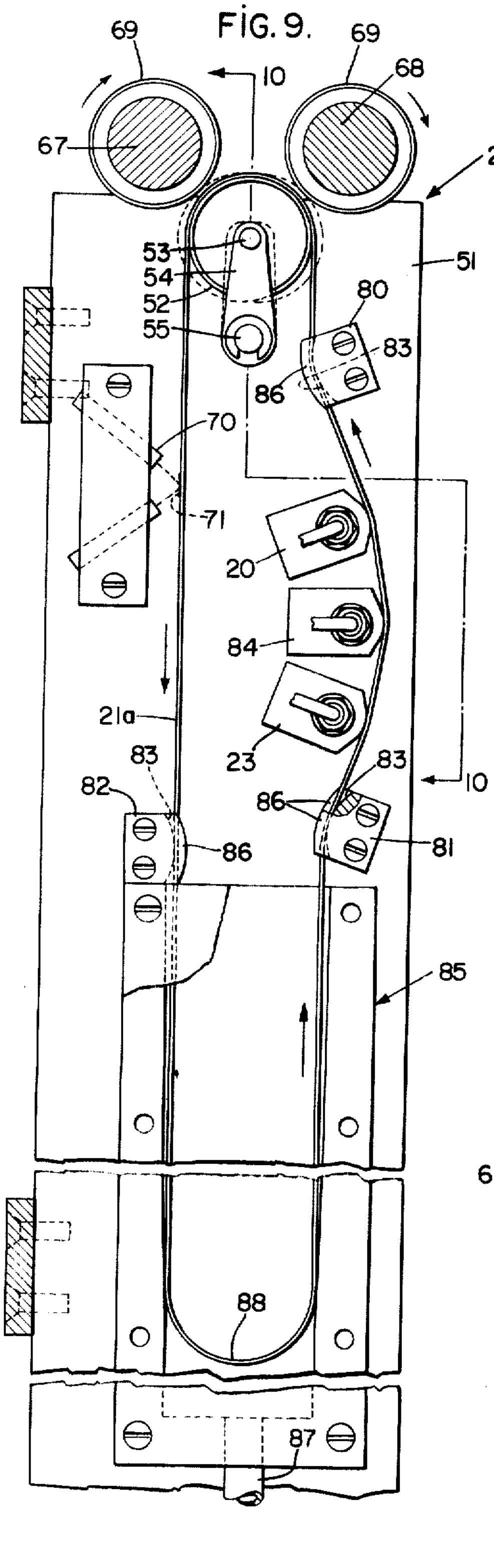
FIG. 9 is a side elevational view of one view of a multi-unit buffer mechanism, portions thereof being broken away.
Figure 10:
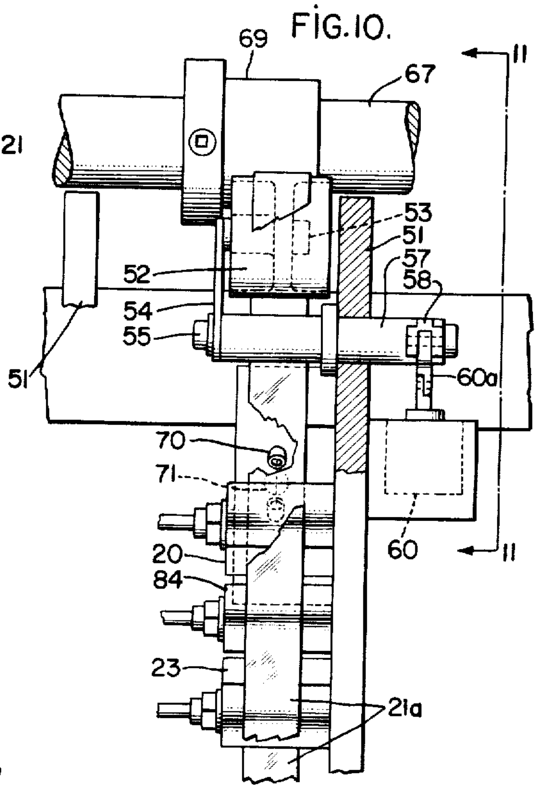
FIG. 10 is a fragmentary, sectional view taken along line 10—10 of FIG. 11.
Figure 11:
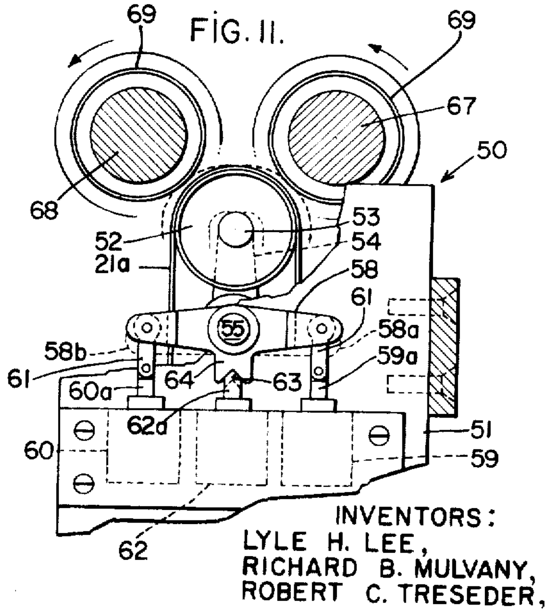
FIG. 11 is a fragmentary, sectional view taken along line 11—11 of FIG. 10, portions being broken away.

The coded, word-selecting impulses from the data processing mechanism 12, acting through the selector mechanism 17, operatively connect successive required pick-up transducers 19 of the vocabulary mechanism 18 to the recording transducer 20 of a selected unit 21 of the multi-unit buffer mechanism 22. These successive vocabulary transducers 19, individually scanning the sound tracks of the words and symbols of the vocabulary mechanism, pick up and record on a selected buffer unit 21 the words and symbols required to compose the answer to each coded inquiry from a subscriber, such as broker 14. During such composition of an answer message on a selected buffer unit, such as, for example, the tape unit 21 illustrated in detail in FIGS. 8–10 and to be described later herein, the vocabulary drum 25 is being driven at its high, operating speed, and the two speed buffer unit 21 is being driven at the higher of its two speeds.

Upon the completion of each recording or composing cycle of each answer message on a selected buffer unit, the data processing mechanism 12 is switched by conventional switching means, not shown, into operatively ready association with another tape unit of the buffer mechanisf, and is thereupon ready to compose an answer to a next successive inquiry. Also, upon completion of its high speed, message recording cycle of operation, such selected buffer unit 21 is slowed to its slower speed, which, in the presently assumed instance, is one fiftieth of its speed during the message recording cycle. A pick-up transducer 23 (FIGS. 1, 9 and 10), operating in conjunction with such selected buffer unit 21, then picks up therefrom the audio message recorded thereon during its preceding, high speed recording cycle and transmits such message, at this slow, aurally understandable rate of speed, through the broker's inquiry exchange 15 and back to the broker 14 making the inquiry. There the message is received as by telephone or loudspeaker.

Referring to the illustrative embodiment of the invention shown in FIGS. 1–3 and 4–12 in greater detail, the data input encoding mechanisms 10*a*, 10*b* and 10*c* may be located, for example, in each of three different trading centers A, B and C on the floor of the New York Stock Exchange. Each of said data input encoding mechanisms may be for example, a conventional punched tape typewriter, or other suitable type of encoding mechanism, many of which are well known and in common use.

The encoded data from the data input encoding mechanisms 10*a*, 10*b* and 10*c* are transmitted in a conventional manner by suitable transmission means, such as by microwave, or over co-axial cables or telephone or telegraph lines, through the data input exchange 11, of a type well known to those familiar with the computer and telephone and telegraph arts, to the data processing mechanism 12. There the data are stored, for example, in the form of characters composed of magnetic data bits at selected zones of magnetic coated recording media, such as disks 24 (FIG. 6) of the data processing machine 12. Since such data processing mechanisms, and the means for supplying the coded information thereto, storing it therein in accordance with selected programming, and triggering it therefrom in response to coded inquiries are well known, and since the details thereof are not a part of the present invention, it will be unnecessary to illustrate or described them in detail herein.

For the purpose of the present description it will be assumed that the data processing mechanism 12 is a digital computer of a type which employs seven-bit characters, for example the well known "7090" computer manufactured by International Business Machines Corporation. In such mechanisms each selected zone of a selected track of a selected one of a plurality of magnetic coated disks with which the computer is provided is adapted to have seven magnetized data bits recorded thereon. The combination produced by the presence or absence of a data bit in each of the seven portions of each character recording zone determines the character stored therein and to be transmitted thereby.

Each inquiry encoding mechanism 13, one or more of which is provided in the office of each broker or other subscriber to the system, transmits coded inquiries to the computer 12 through the broker's inquiry exchange 15 which is of a type well known in the computer and telephone arts. The inquiry encoding mechanisms may be conventional telephone dialing mechanisms, punched tape typewriters, or other suitable type of data encoding mechanisms, many of which are well known and in common use. Each such inquiry identifies a particular security or other item listed in the system about which such inquiry is made, and may also include a request for any historical, special or statistical inquiry which the system is designed to answer. An inquiry may also include its own coded address in order that the reply will be directed back to the source of the inquiry.

Upon receipt by the computer 12 of a coded inquiry from a broker's office, for example broker 14, the computer is ready to transmit the necessary sequence of seven-bit word-selecting characters required to select the successive transducers 19 scanning the words and symbols recorded on a vocabulary drum 25 necessary to compose the message for answering such inquiry. The computer 12, controlled in a manner to be described later herein, transmits these successive word-selecting characters to the selector mechanism 17, as shown diagrammatically in FIG. 6.

The selector mechanism 17 is operated in a well known manner by the seven-bit characters from the computer 12. Three conductive paths 27, 28 and 29 (FIG. 6) are provided from the computer 12, one for each of the first three bit zones of each character, and four similar conductive paths 30, 31, 32 and 33 for the last four bit zones thereof. The combination provided by selective magnetization of the first three bit zones of each character stored in the computer, and thus transmitted to the selector mechanism 17, selects any required one of eight transverse conductors 34 of a conventional wire grid 35, while selective magnetization of the last four bit zones of each character similarly selects any one of sixteen upright conductors 37 of the grid. A selector grid of this general type is disclosed in Patent No. 2,899,657. By this means any one of the one hundred and twenty-eight intersections of the two sets of grid conductors 34 and 37 may be selectively energized. For example, in FIG. 6, by energizing horizontal grid conductors **34*a* and vertical grid conductor 37*a* their intersection 36 is thereby energized. Means, not shown, are provided in a well known manner, one for each intersection of the grid 37, so that when the two conductors forming an intersection are energized, a circuit is thereby closed for switching a selected transducer 19 of the vocabulary mechanism 18 individually associated with such intersection into operative relation with the recording transducer 20 of a selected buffer unit 21** upon which a message is being composed.

Figures 6, 7:
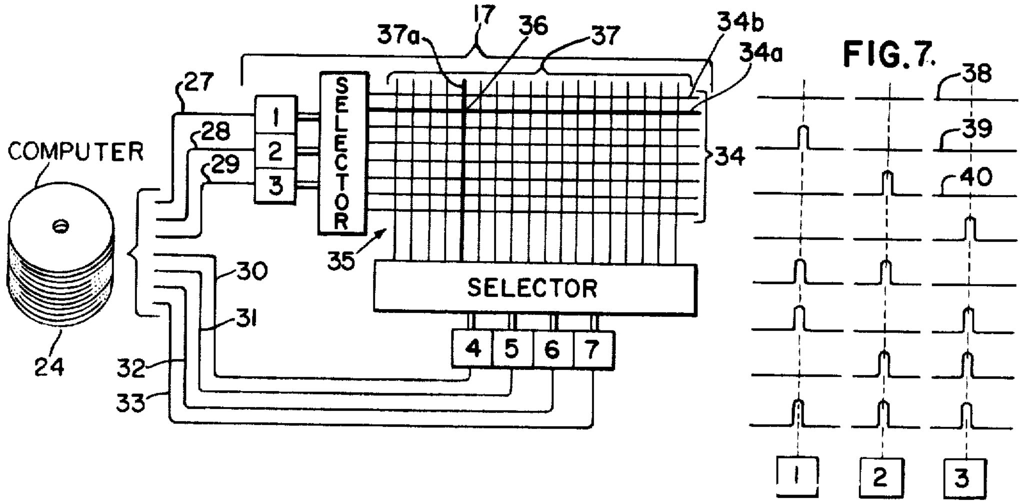
FIG. 6 is a diagrammatic showing of the vocabulary transducer selector mechanism employing a conventional, wire grid matrix, which selector mechanism, in response to coded impulses from the data processing mechanism, selects a required juncture terminal of the grid for each desired word or symbol of a message to be composed from the vocabulary mechanism.
FIG. 7 is a schematic illustration of the manner in which the first three "bit" zones of the seven-bit "character" from a computer, which, in the illustrative system disclosed herein comprises the data processing mechanism, are used to select a required one of eight transverse wires of the grid of FIG. 6.

The manner in which selective magnetization of the first three bit zones of each character acts to provide the various combinations for selecting any required one of the eight transverse grid conductors 34 is illustrated diagrammatically in FIG. 7. In this figure the vertical broken lines indicate, respectively the conductive paths for the first three bit zones of each character as represented by the boxes 1, 2 and 3 of FIG. 6. Each horizontally aligned set of three lines in FIG. 7 indicates the condition of the respective conductive paths from said three bit zones, i.e., whether energized or not, or, in other words, whether or not their respective bit zones of the character being transmitted by the computer are magnetized. The upper horizontally aligned set of three lines 38 of this diagram indicates that none of the three bit zones of a character being transmitted is magnetized. This is assumed to be the condition required for the selection of the topmost transverse conductor **34*b* of the grid 35. The second horizontally aligned set of three lines 39 indicates that the first bit zone is magnetized and the other two not, which is assumed to select the second transverse conductor 34*a*. The third horizontally aligned set of lines 40 indicates that the second bit zone only is magnetized, and so on. As many grids 35 with a corresponding vocabulary transducer 19** for each intersection thereof are employed as are required by the size of the vocabulary.

The vocabulary mechanism 18 herein illustrated comprises the magnetic coated drum 25 having a large plurality of transducers 19 mounted in axially offset relation thereto. Each transducer 19 operatively scans a separate circumferential sound track of the rotating drum 25, and each such sound track has an audio type element of the system's vocabulary, such as a word or symbol, recorded thereon. The specific type of vocabulary mechanism employed is not essential to the invention, and obviously magnetic coated disks, tapes, optical sound tracks or other suitable and well known recording media may be employed.

The illustrated magnetic coated drum 25 and its associated transducers 19 are of a type employed in the well known "Ramac" computer manufactured by International Business Machines Corporation. The drum 25, which may be of aluminum and coated with a suitable magnetic material such as nickel cobalt, is driven at high speed during operation of the system by an electric motor 46 (FIG. 12). This speed, for the purpose of the present description, is assumed to be 6000 r.p.m. At this speed each sound track on the drum 25 passes its respective transducer 19 at the rate of 100 times per second, so that obviously at this speed the words and symbols of the vocabulary recorded on the drum 25, as picked up by their respective transducers 19, are aurally unintelligible.

Figure 4:
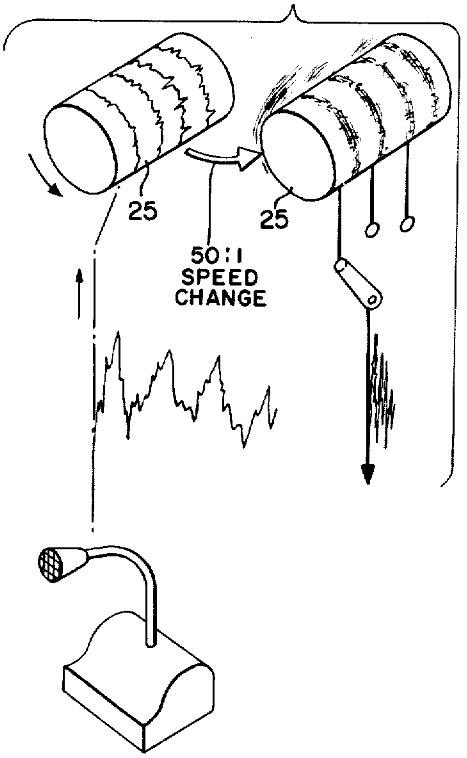
FIG. 4 is a diagrammatic, perspective view showing how words and symbols may be recorded directly on the magnetic coated vocabulary drum while the latter is rotating at slow speed, after which the speed of rotation of the vocabulary drum is multiplied to its operative speed.

The words and symbols comprising the vocabulary may be recorded directly on the drum 25 by a person speaking into a microphone 42, as indicated diagrammatically in FIG. 4. During such direct recording operation the drum 25 is driven to rotate at a relatively slow speed, for example, at 120 r.p.m. which is $\frac{1}{50}$ of its presently assumed high, or operative rate. One word, symbol or other element of the vocabulary is then recorded on a sound track of the drum 25 individually assigned to that particular vocabulary element, which sound track is operatively scanned by a transducer 19.

Instead of the direct recording procedure described in the preceding paragraph, it is preferred to record the desired words and symbols of the vocabulary on the drum 25 while the latter is traveling at its high, or operative, rate of speed, which, for the purposes of the present description is assumed to be fifty times the speaking rate during original recording of the vocabulary elements. This may be done by means of a two-speed transfer mechanism such as that shown diagrammatically in FIG. 2. This transfer mechanism comprises a two-speed tape 43 as a recording medium, and during the original recording of a spoken voice on the transfer tape 43, as by means of a microphone 42, the tape 43 is driven at its slower rate of speed, for example, 4 inches per second.

The transfer tape 43 is then, for the conditions assumed herein, accelerated to a speed 50 times that at which the recording was made thereon. Each word and symbol thus recorded on the transfer tape is then picked up from the transfer tape 43 and is recorded on its individually assigned sound track on the vocabulary drum 25 while the latter is also turning at its high or operative rate of speed. This two-speed transfer mechanism may be used not only for original recording of the vocabulary elements on the vocabulary mechanism, but also for changing or correcting existing words or symbols of the system's vocabulary without taking the latter out of operation.

Figure 2:
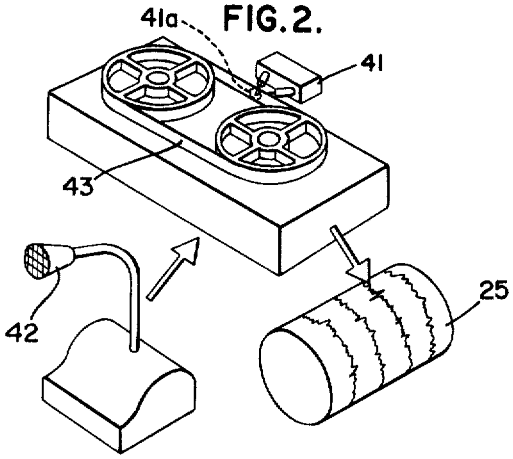
FIG. 2 is a diagrammatic, perspective view of a two-speed magnetic transfer tape arranged for recording words and symbols uniformly and at high speed on the vocabulary storage mechanism.

For changing an existing word or symbol on the drum 25, it is merely necessary to erase, by conventional erasing means, such word or symbol from its assigned sound track while the vocabulary drum 25 is turning at its high or operative rate of speed, and then to record the new or corrected word, symbol or other vocabulary element in its place by means of the transfer mechanism of FIG. 2. During the transfer of a word or symbol from the transfer tape 43 to the vocabulary drum 25 the tape and drum are synchronized by suitable and well known means, for example, by employing an optical timing mechanism 41 for the transfer tape 43, and a similar one 44 for the vocabulary drum 25, which timing mechanisms are described later herein.

The vocabulary transfer mechanism of FIG. 2 has an additional important advantage in that it permits editing of different words having the same meaning in order to find those which best serve the intended purpose, such as high fidelity, duration, clarity, etc., before these words are recorded on the vocabulary drum or other vocabulary recording medium employed. The transfer mechanism also facilitates the accurate positioning of each word or symbol on its allotted sound track of the vocabulary mechanism. Since the difference in the high and low speeds of the transfer tape 43 is the same as that of the buffer units 21 it will be obvious that one of the latter may be readily adapted for use as a transfer mechanism.

Where each sound track of the vocabulary recording medium such as the drum 25 has one word only recorded thereon, regardless of the length of the word, and the sound tracks are all of equal length, a short word will obviously not fill completely a sound track capable of having recorded thereon the longest words for which the vocabulary mechanism is designed. In such an arrangement there will, therefore, be a slight gap between words, when one of them is a short word.

In order to avoid such gaps between words of different lengths in a message composed on a buffer recording medium such as a tape 21, the cyclical recording surface of the vocabulary recording medium may be divided, lengthwise of its direction of travel relative to its transducers, into a plurality of timing zones, each of which zones is of suitable length to have recorded thereon any of the short words of the vocabulary to be used, and the entire cyclical length of the recording surface is sufficient to have recorded thereon any of the longest words to be used.

Such a division is indicated diagrammatically in FIG. 13, wherein the bracketed portion **25*a* represents the unrolled or developed recording surface of the vocabulary drum 25, and the bracketed portion 25*a* represents a second or succeeding revolution of the surface 25*a*. The lines 0 and 3 represent a single line on the drum surface 25*a*** before the latter is unrolled.

In the arrangement illustrated in FIG. 13, words of a vocabulary to be employed are divided arbitrarily into three length categories, as short, medium and long, and the words are represented as being recorded on individual sound tracks of the recording surface **25*a***. As an example of a short word, the word "one" has been chosen. As an example of a medium length word, the word "preferred" has been chosen, and as an example of a long word the word "cumulative" has been chosen.

Each rotative cycle of the drum 25 is timed in three equal parts, or timing zones, by suitable timing means, such as, for example the light beam projecting and photocell mechanism 44 of FIG. 12, and three equally spaced, light reflective spots 48, 48' and 48'', adhesively attached to the rotating vocabulary drum surface **25*a* in the path of the light beam 47** (see FIG. 12). These three words zones are represented, respectively in FIG. 13, by the reference letters X, Y and Z.

Each short word, such as the word "one," is then recorded on a selected sound track of the drum surface **25*a*** once in each of three timing zones X, Y and Z as shown in the topmost sound track of FIG. 13. In the case of the medium and longer words such as "preferred" and "cumulative," each word, in order to be available at the beginning of the next timing zone following the completion of any preceding word, is recorded once on each of three different sound tracks on the drum, each such recording of each word starting in a different one of the timing zones X, Y and Z.

The programming of the computer employed is arranged in a conventional manner so as to begin each word of a message being composed in the timing zone of the vocabulary recording surface **25*a* immediately following the zone in which the preceding word of such message was completed. Thus, in the example illustrated in FIG. 13, it will be assumed that the words "one cumulative preferred" are to follow in that sequence in a message being composed. It will be assumed further that the first word "one" is picked up by its transducer from the first zone X, of the vocabulary drum surface 25*a* (FIG. 13) and is recorded on a selected buffer tape 21 in the manner described previously herein. The next word "cumulative" is then picked up by its transducer and recorded on the selected buffer tape beginning in the next succeeding zone Y from the next to lowest sound track of FIG. 13 and extends through the last two zones Y and Z of the recording surface 25*a*. This word "cumulative" is completed in the first zone X' of the next succeeding drum revolution, after which the word "preferred" is then picked up by its transducer and recorded on the buffer tape beginning in zone Y' of such next revolution 25*a'*** from the third sound track from top of FIG. 13. The vocabulary transducers are not shown in FIG. 13 to avoid complicating the figure, but one thereof is provided for each sound track as shown in FIG. 12 and is described previously herein.

The multi-zone vocabulary arrangement illustrated in FIG. 13 would, of course, expand considerably the number of sound tracks and their associated transducers required in a vocabulary mechanism, since each word having a pronunciation length greater than the established minimum would require a plurality of sound tracks, as illustrated, one for each circumferential timing zone of the recording surface.

It is common practice in digital computers to control the release of successive characters therefrom by electrical pulses, so that upon the receipt of each pulse, the next successive character will be released by the computer. This pulse controlled release of computer operations has been necessary in the past where, as in the present instance, successive operations of the computer are to be synchronized with slower mechanical operations. So, in the present invention, although the vocabulary drum is rotating at an assumed speed of 100 r.p.s. the computer is capable of transmitting word-selecting characters therefrom at a very much higher rate. A pulse, therefore, is fed to the computer by suitable timing means for each revolution of the vocabulary drum 25 to signal the start of a word-scanning cycle by each vocabulary transducer 19. Obviously, in the modification shown in FIG. 13, a pulse would be fed to the computer at the beginning of each timing zone of the recording surface **25*a***.

A satisfactory timing pulse generating mechanism may comprise an optical timing mechanism 44 (FIGS. 1 and 12), comprising a light beam generator 45 (FIG. 12) of a well known type, mounted to direct a narrow light beam 47 onto a path defined by a light-reflecting spot 48 on the surface of the rotating drum 25. A usual photo-cell 49, which may be of the voltage-generating type, is mounted in the path of a reflected light beam **47*a*, so that upon each rotation of the drum 25 the disk 48 reflects the light beam 47 along the path 47*a* onto its associated photo cell 49. This illumination of the photo cell causes the latter to generate the required electric pulse which is conducted, by suitable circuitry of a well known type, to the computer 12** to signal the completion of each word pickup cycle of the drum.

During the composition of a message, each time the timing mechanism 44 generates a pulse by such reflection of the light beam 45 indicating the completion of a word, the next successive word-selecting character will be released from the computer 12, and, acting through the selector mechanism 17, will select a required intersection of the grid 35 and thereby cause the vocabulary transducer 19 operatively associated with such intersection to pick up from its associated sound track of the vocabulary drum 25, and record on the selected buffer unit 21, the next required vocabulary element of the message being composed.

Each illustrated buffer unit 21 (FIGS. 9–11) comprises a mounting panel 51 having a light weight, tape supporting roller 52 mounted at its upper end for back-and-forth swinging movement. Each roller 52 is journaled on a pin 53 mounted at right angles on the free end of a lever arm 54. The other end of the lever arm 54 has secured thereto a rock shaft 55 journaled in a bushing 57 mounted in the support panel 51. The rock shaft 55, which is axially parallel to the roller mounting pin 53, extends entirely through the panel 51, and an actuating beam 58 is secured to the opposite end of the pivot pin 55 from the lever arm 54.

A pair of beam actuating solenoids 59 and 60 (FIG. 11) are mounted on the panel 51 below the beam 58, and their armatures **59*a* and 60*a* are connected, one to each end of the beam 58, by links 61. Upon energization of the solenoid 59 the beam 57 is rocked clockwise from its solid to its broken line position 58*a*, while upon energization of solenoid 60 the beam is rocked in the opposite direction to its broken line position 58*b***.

A centering solenoid 62 has the upper end of its armature **62*a* wedge shaped and positioned to enter a V-shaped detent 63 in a central projection 64 of the beam 58. The armature 62*a* of the centering solenoid 62 is spring biased toward the detent 63, and its coil (not shown) is electrically connected in a well known manner for simultaneous actuation with whichever of the beam tilting solenoids 59 or 60 is energized, but is de-energized when neither of the latter is actuated. The spring bias on the armature 62*a* of the centering solenoid 62 holds the beam 58, and with it the tape supporting roller 52, in their centered, solid line positions of FIG. 11 except when one or the other of the beam tilting solenoids 59 or 60** is actuated.

Two capstan shafts 67 and 68, for selectively driving the roller 52 and the magnetic coated tape loop **21*a* passed thereover, are journaled in laterally spaced relation to extend transversely of the upper ends of the panels 51, and with a slight lateral clearance from the rollers 52 and the tapes 21*a* thereon. The panels 51 and their associated mechanism are mounted as on frame members 56 and 56*a*, in parallel spaced relation as indicated by the fragment 51*a*** of a second, similar panel shown in FIG. 10.

Each of the capstan shafts 67 and 68 is provided with a band 69 of high coefficient-of-friction material, such as neoprene, laterally opposite each tape roller 52 for frictional driving engagement with the tape **21*a* thereon when the pulley is swung, by selective actuation of the solenoids 59 and 60**, to bring its tape into driven engagement with one or the other of the capstan shafts.

One of the capstan shafts, for example the shaft 67, is driven by suitable power drive means, not shown, at a speed which is assumed herein to be 50 times the speed of the other capstan shaft 68. During the time a message is being recorded on a selected tape **21*a* from the vocabulary mechanism 18 as explained previously herein, such tape is driven at its higher rate of speed by being swung into driven relation with the capstan shaft 67 by energization of the solenoid 59, while when the message is being played back for transmission to a subscriber, such tape 21*a* is driven at its slower rate of speed by being swung into driven relation with the other capstan shaft 68 by energization of the solenoid 60**.

A suitable high rate of speed for the tapes has been found to be 200 lineal inches per second, with a suitable low speed rate of 4 lineal inches per second. Assuming a speaking rate during original recording of two words or other vocabulary elements per second, this would require a tape length of slightly over two inches for each word of the maximum length of answer message to be recorded on a single tape loop **21*a***. The slight additional tape length provides for a slight delay which is necessary at the initiation of each high speed driving cycle of a selected tape while the latter is being brought up to speed.

The time required for a tape to attain its high speed rate of travel upon actuation of the high speed solenoid 69 is of the order of 7 to 10 milliseconds. A delay of 10 to 20 milliseconds may be provided for in a well known manner between the time when the computer 12 is ready to transmit the first word selecting character to the vocabulary transducer selector 17 and the time at which such first character is released for such transmission by allowing the light reflecting spot 48 on the vocabulary drum 25 to pass its timing mechanism 44 twice before releasing such first word selecting character from the computer. This can be done by conventional programming of the computer.

A tape timing mechanism 70 for controlling the operation of each tape **21*a*, and for bringing each tape to rest in a selected starting or "home" position upon the completion of each message receiving and transmitting operation thereof, may be similar to the one 44 provided for the vocabulary drum 25 and described previously herein. A similar light-reflecting spot 71 is also provided on each buffer tape 21*a* in the path scanned by its timing mechanism 70**.

Tape guide members 80, 81 and 82 are mounted on each panel 51 to guide their associated tape **21*a*. Each of said guide members has an arched, tape supporting face 83 of smoothly polished, hard wearing material such as chrome plated metal. The tape recording head 20 and pick-up head 23, plus also a conventional erase head 84, are also mounted on each tape supporting panel 51 for operative support of the tape 21, and their tape supporting faces are arched in a well known manner like those of the guide members 80, 81 and 82 so that each tape 21*a*, at high speed, will have air bearing support relative thereto. The tape guide members 80, 81 and 82 are also provided with raised side flanges 86 which provide a tape guiding channel therebetween to prevent lateral displacement of the tape. These side flanges 86** are subject to extreme tape wear, since obviously the tape has no air bearing support relative to them, and are preferably made of a very hard substance, such as silicon carbide.

The erase head 84 preferably is mounted rearwardly of the pick-up or read-out head 23, and ahead of the recording head 20 relative to the movement of these heads to the tape, so that after a message recorded on the tape has been read out to a subscriber it can be erased from the tape either during the same, low speed, read-out cycle, or during the next succeeding high speed recording cycle of tape travel. Either arrangement avoids the necessity of an additional or third erasing cycle of the tape.

A vacuum box 85 of a well known type provides what amounts to weightless pulley support for the lower end of each tape loop 21. Each vacuum box 85 is of a depth from front to rear to permit a tape of specified width to run freely therein without binding, and is of a height to clear the lower end of a tape of a required length. A suction line 87 is connected to the lower end of each vacuum box 85, and the pressure in such lower end is reduced to a required degree by suitable, conventional evacuating and control means, not shown. This evacuation of the lower end of each vacuum box 85 forms the lower end of each tape therein into a rounded loop 88, and exerts a required bias of the tape toward its associated transducers 20, 23 and 84.

Figure 3:
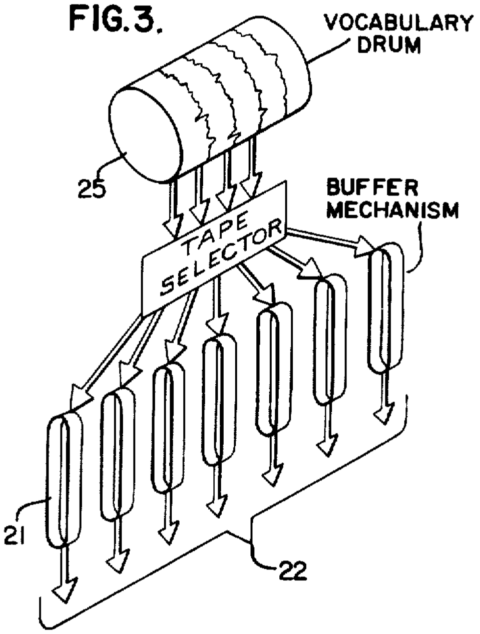
FIG. 3 is a diagrammatic, perspective view of the vocabulary drum, tape selector, and multi-unit, two-speed buffer mechanism.

While the buffer units 21 are indicated in FIGS. 1 and 3 as being all in one location, this is not material to the invention, since they can be located wherever is most convenient, and individual buffer units can, if preferred, be located at different points remote from each other and from the data processing mechanism 12.

Also, although the drum 25 of the illustrated form of the vocabulary mechanism 18, and the tape 21*a* of the illustrated form of buffer unit 21 are driven while the respective transducers thereof are stationary it will be obvious that such arrangement is not essential to the invention, and that either the recording medium, or the transducers, or both, may be driven, and such variations are contemplated both in the present description and in the accompanying claims as mechanically equivalent arrangements. An example of an arrangement embodying a stationary recording medium and moving transducer is disclosed in patent application Serial No. 79,626, filed December 30, 1960, by Robert C. Treseder and assigned to the assignee of the present application.

In a system embodying the present invention it will, of course, be necessary to provide the various circuits, including conventional switching mechanisms, amplifiers, repeaters, storage mechanisms and other well known electrical and electronic apparatus in a manner which will be obvious to those familiar with the computer and telephone arts. To illustrate and describe such well known circuits and mechanisms would unnecessarily complicate and enlarge the present description and, since the details thereof are not a part of the present invention they are not included herein.

Figure 8:
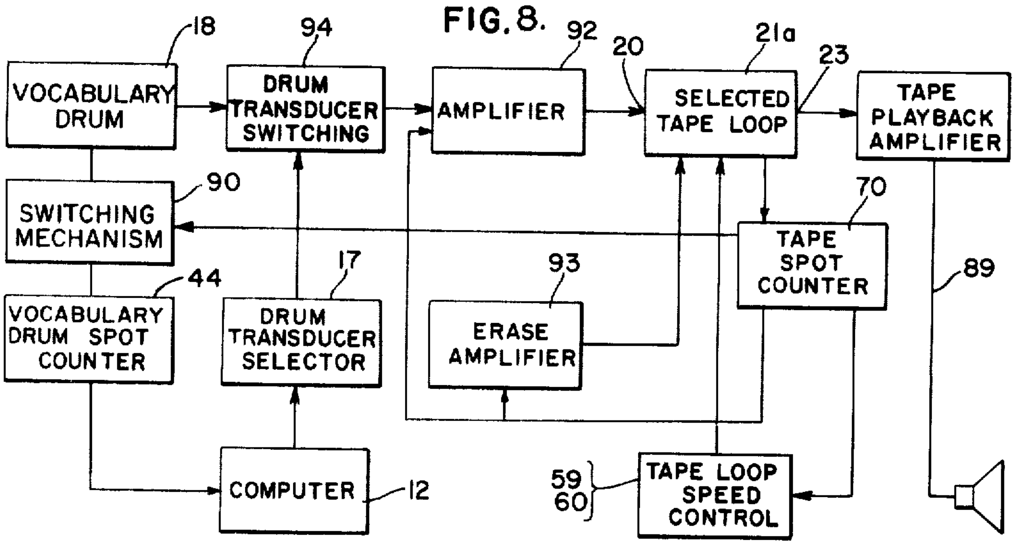
FIG. 8 is a schematic illustration of an arrangement for operatively interconnecting the vocabulary mechanism and a unit of the illustrated form of buffer mechanism.

A suitable arrangement of well known electrical and electronic mechanisms for transmitting selected words and symbols from the vocabulary mechanism 18 to the recording unit buffer mechanism 22, and thence to a subscriber's line 89, is shown diagrammatically in FIG. 8, and will be described briefly in conjunction with the operation of its various parts.

Assuming that the computer 12 is ready, in response to a coded inquiry received from broker 14 or other subscriber, to compose a message in answer to such inquiry, a conventional switching mechanism 90 (FIG. 8) checks the tape timing mechanism 70 of the selected buffer unit 21 which is to receive the next answer message to insure that such unit is ready to receive the message. Upon receiving a positive response to such check, the switching mechanism 90 energizes the high speed solenoid 59 (see FIG. 11) of such selected buffer unit 21, thereby swinging its associate tape loop 21*a* into driven engagement with the high speed capstan shaft 67.

Beginning with the energization of the high speed solenoid 59, the vocabulary timing mechanism 44 counts two pulses by reflection of the light beam from the spot 48 on the vocabulary drum 25 to thereby provide a delay of between 10 and 20 milliseconds (each revolution of the vocabulary drum requiring 10 milliseconds) to permit the selected tape loop 21*a* to come up to speed. The computer 12 then releases the first word-selecting character to the selector mechanism 17 (explained previously herein in connection with FIG. 6). The selector mechanism connects the required vocabulary transducer 19 (FIG. 12) by means of transducer switching means 94, through conventional amplifier means 92, to the recording transducer 20 of such selected tape loop 21*a* to thereby record on the latter the selected word, symbol or other vocabulary element picked up by such vocabulary transducer 19. Upon the receipt by the transducer 12 of each succeeding word completing pulse from the vocabulary drum 25 (FIG. 12) until the message is completed an additional word-selecting character is similarly released from the computer 12 to the selector mechanism 17. Thus the required, successive vocabulary elements for composing the answer message are similarly picked up from the vocabulary drum 25, amplified, and recorded on the selected tape loop 21*a*.

As each selected tape loop 21*a* with a message recorded thereon completes its high speed cycle, the tape timing mechanism 70 is pulsed by the bright spot 71 on its associated tape loop 21*a* passing therebeneath. The high speed solenoid 59 is thereupon de-energized by conventional, pulse controlled circuit means, and the slow speed solenoid 60 is simultaneously energized by such circuit means to swing the pulley 52 to bring the tape 21*a* into driven relation with the slow speed capstan shaft 68. Simultaneously the tape recording transducer 20 is de-energized and the tape pick-up or play-back transducer 23 (FIGS. 9 and 10) is energized. During the ensuing slow speed cycle of the tape 21*a* the tape pick-up transducer 23 picks up the message recorded on the tape during its preceding high speed cycle and transmits such message through the return line 89 back to the sender of the inquiry by conventional circuit means as illustrated diagrammatically in FIG. 1.

An erase amplifier 93 (FIG. 8) for energizing the tape erase head 84 (FIGS. 9 and 10) may be energized during either the high or low speed cycle of the tape provided the erase head is mounted ahead of the tape pick-up transducer 23, and rearwardly of the recording transducer 20 relative to the movement of the heads to the tape.

The maximum message length that can be recorded during one revolution of a tape loop 21*a* is determined by the play-back speed and the length of the tape loop. The preferred form of this invention comprises a plurality of tape loops 21*a* of equal length. Where variable length messages are to be composed, a preferred tape loop length is one which is capable of recording approximately 75% of the individual messages normally occurring. Messages of greater length are divided into parts, and are recorded either during two or more recording cycles of an individual tape loop, or upon two different tape loops.

When a single tape loop is employed for this purpose, a long message requiring more than one recording cycle of a tape loop will have the first portion thereof recorded and played back to the inquirer during a first recording and play-back cycle of a selected tape loop 21*a*. The second portion of the message is then recorded on the same tape loop and played back to the subscriber. There is a short pause between the two parts of the message equal to the time required for the high speed recording cycle of the tape to record the second portion of the message. The switching and controls necessary for this operation are conventional in combination with normal programming for the data processing machine employed.

*Operation*

The operation of the inquiry system shown in FIG. 1, and of the two speed buffer mechanism 22 incorporated therein is as follows:

Assume that stock of the XYZ Company, one of the securities listed in the system, in its last previous transaction, sold in Stock Exchange area A at 9⅜. This information is encoded in a well known manner by means of the data input encoding mechanism 10*a* of said stock exchange area A, and is transmitted, through the data input exchange 11, to the data processing mechanism 12. There the stored data pertaining to XYZ stock is adjusted by conventional actuation of the data processing mechanism in accordance with its programming set-up to bring the data pertaining to XYZ stock up to date. Assume also that the latest bid on XYZ stock was 8¼, and the latest offer was 9½.

Upon each new bid, offer or sale concerning any of the listed securities of the system, the necessary coded data pertaining thereto is similarly transmitted from the stock exchange area where the transaction occurs to the data processing mechanism 12. Thus, the data stored in the data processing mechanism 12 is constantly maintained in current condition.

Upon the initiation of a coded inquiry from the office of a broker or subscriber, for example, broker 14, by operation of the inquiry encoding mechanism 13 located in the office of such broker, such coded inquiry is transmitted through the broker's inquiry exchange 15 to the data processing mechanism 12. There the coded inquiry actuates the data processing mechanism 12 in a conventional manner and causes it, as described previously herein, under the timed control of the vocabulary mechanism timing mechanism 44, to release successive word-selecting characters to the selector mechanism 17. The latter in turn switches successive, selected vocabulary transducers 19 into recording relation with the recording transducer 20 of a selected tape 21*a* for recording on the latter, at the herein assumed rate of 100 words per second, the words and symbols composing the answer to such inquiry.

Upon completion of its high speed recording cycle and by means of a pulse from the tape timing mechanism 70, the computer 12 is switched into operative relation with a next successive buffer unit, and the tape on which the message has been recorded is slowed to its herein assumed slow speed of one fiftieth of its recording speed. The message recorded thereon is then picked up by its associated pick-up transducer 23 at substantially the same speed as that at which the words and symbols comprising the message were originally spoken. The message in the form in which it is thus picked up from the tape is then transmitted by conventional telephone and computer circuits and mechanism, back to the office of the one making the inquiry.

Assuming that a stock quotation message is to be transmitted in answer to an inquiry from broker 14 concerning the current bid, asked and sale prices of the stock of the XYZ corporation, based upon the conditions assumed previously herein for said stock, the answer composed and transmitted by the system would be "XYZ eight and one quarter to nine and one half last sale nine and three eighths." This message comprises 18 vocabulary elements from the form of the vocabulary mechanism wherein each word occupies a complete sound track of the drum 25, and means: "The latest bid on XYZ Stock was 8¼, the latest offer was 9½, and the last sale was at 9⅜." With the herein assumed recording time of 10 milliseconds per word, plus the herein assumed maximum tape speed-up delay of 20 milliseconds, the actual recording time for this entire message on the tape is only of the order of 200 milliseconds.

Upon the completion of the recording of each message on a selected tape, conventional switching means releases the computer so that it may supply characters for a next selected tape unit, and the system is thereupon ready to answer the next incoming inquiry from a subscriber.

It is estimated that the average answer for a stock quotation system will be approximately twenty vocabulary elements, but even assuming an answer of 48 vocabulary elements, the time required for recording such message on a selected tape, including a maximum wait time of 20 milliseconds while the tape is brought up to speed, would be only ½ second. The only part of the system which would operate at a lesser speed than this would be the relatively inexpensive buffer units, and these can be easily multiplied as required up to the maximum capacity of the system, which at the assumed speeds, would be approximately 7200 forty-eight word messages per hour.

With the herein assumed read-out rate of two words per second, it would require approximately twenty five seconds to read out a forty eight word message, allowing for the blank space at the beginning of the tape during the 20 millisecond delay during which the tape was being brought up to high speed during the recording cycle.

Figure 5:
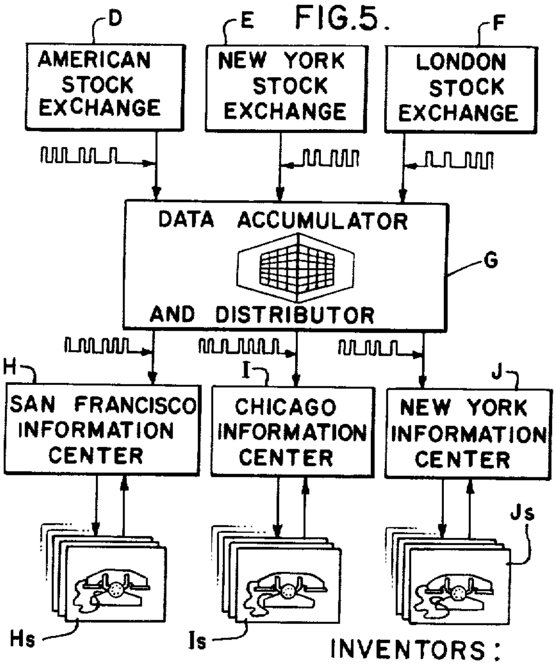
FIG. 5 is a diagrammatic illustration of a modified form of the system shown in FIG. 1.

In the modified form of the invention shown in FIG. 5, coded information from a plurality of different stock exchanges for example, the American Stock Exchange, D, the New York Stock Exchange, E, and the London Stock Exchange, F, is all fed into a single, main data accumulator and distributor mechanism G. The latter may be, for example, a computer of the same general type as the computer 12 of FIG. 1, but arranged and programmed to maintain in current condition a plurality of sub-computers H, I and J, which serve as area information centers located respectively, for example, in San Francisco, Chicago and New York.

The subscribers to the system, represented by the three groups H's, I's and J's direct their respective inquiries to the information center H, I or J nearest thereto, and the answers are composed by the computers in these information centers and transmitted to the subscribers by means of high speed vocabulary mechanisms and two speed buffer mechanisms such as those described previously herein. All three of the information centers H, I and J are constantly up-dated by the main data accumulator and distributor G from coded information received by it from the contributing stock exchanges D, E and F. Otherwise the system diagrammatically illustrated in FIG. 5 operates in the same general manner as that described for the system of FIG. 1 described in greater detail previously herein.

The invention provides a system whereby current data is supplied to a data processing mechanism to keep the latter constantly up to date, and, by means of the high speed vocabulary mechanism 18 and the multi-unit, two speed buffer mechanism 23, provides almost instant voice type answers to coded inquiries from a large number of widely separated points.

The invention also provides an information system capable of composing answers to coded inquiries in the form of relatively short, voice type messages from a vocabulary of preferably several hundred words, the information upon which such answers are based being derived from a large store of recorded data which are constantly up-dated, and wherein an extremely high rate of inquiry is provided by multiplying as required the relatively inexpensive two speed message recording and transmitting buffer units.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A code to voice inquiry system comprising a first recording medium having a plurality of audio type vocabulary elements recorded therein, means for driving said first recording medium at a high speed in excess of any speed at which such vocabulary units when picked up from the first recording medium are aurally recognizable, a plurality of second recording media, means for driving each second recording medium at a first, higher speed and at a second, slower speed, selector means responsive to a coded inquiry for operatively connecting the first recording medium to a selected one of the second recording media, and for picking up selected ones of such vocabulary elements from said first recording medium while the latter is being driven at its high speed and for recording such selected vocabulary elements in sequence on such selected second recording medium while the latter is being driven at its first, higher speed to thereby compose and record a message on such selected second recording medium in answer to such inquiry, and means for picking up such message from such selected second recording medium while the latter is being driven at its second, slower speed and transmitting such message, in audio form, back to the source of the coded inquiry, the second, slower speed of the second recording medium being one at which such message picked up therefrom is aurally recognizable.

2. A code to voice inquiry system comprising a first recording medium having a plurality of audio type vocabulary elements recorded thereon, a separate transducer scanning each vocabulary element recorded on the first recording medium, means for driving said first recording medium relative to the vocabulary element transducers at a high speed in excess of any speed at which such recorded vocabulary units when picked up by the vocabulary transducers are aurally recognizable, a plurality of second recording media, a recording and a pick-up transducer scanning each second recording medium, means for selecting one of the second recording media, and for driving the latter, relative to the transducers scanning such selected second recording medium at a first, higher speed and at a second, slower speed, selector means responsive to a coded inquiry for operatively interconnecting selected vocabulary transducers to the recording transducer of such selected second recording medium while the latter and its transducers are being relatively driven at such first, higher rate of speed, thereby to compose and record a message on such selected second recording medium in answer to such inquiry, and means for picking up such recorded message from such selected second recording medium while the latter is being driven relative to its transducers at its second, slower speed and transmitting such message in audio form back to the source of such coded inquiry, such second, slower speed being one at which such message is aurally recognizable.

3. A code to voice information system comprising, in combination with a data processing mechanism, having coded data input means operatively connected to the data processing mechanism for maintaining data stored therein in constantly up-dated condition, and having a plurality of coded inquiry mechanisms operatively connected to the data processing mechanism for actuating the latter to supply, in response to each inquiry from one of the inquiry mechanisms, an answer message in the form of a plurality of sets of coded impulses, each of which sets identifies an audio type vocabulary element; a high speed vocabulary mechanism having recorded thereon an audio type vocabulary element for each such set of coded impulses transmitted by the data processing mechanism, means driving the vocabulary mechanism at high speed, a plurality of two-speed buffer recording mechanism, means for selectively driving a selected one of the buffer mechanisms at a higher and at a slower of two speeds, selector means responsive to sets of coded impulses from the data processing mechanism for selecting successive vocabulary elements recorded on the vocabulary mechanism while the latter is being driven at high speed and recording such selected elements on such selected buffer mechanism while the latter is being driven at the higher of its two speeds, thereby to compose on such selected buffer unit a vocal type message in answer to such inquiry from an inquiry mechanism, at a speed greater than that at which said message is intelligible, and means for thereafter driving such selected buffer mechanism at the slower of its two speeds while transmitting therefrom, back to the source of such inquiry, and in intelligible voice form, the message recorded thereon.

4. In combination, a high speed vocabulary mechanism having recorded thereon a plurality of audio type vocabulary elements, a multi-unit, two speed buffer mechanism, means for selectively driving a selected unit of said buffer mechanism at either of two speeds, means for transmitting selected ones of such recorded vocabulary elements from the vocabulary mechanism and recording them on a selected unit of the buffer mechanism at a speed in excess of that at which such recorded vocabulary elements are recognizable and while such selected buffer unit is being driven at the higher of its two speeds, timing means controlling the transmission of such selected vocabulary elements from the vocabulary mechanism to such selected buffer unit, and means for transmitting such vocabulary units from such selected buffer unit while the latter is being driven at the slower of its two speeds, at which speed such transmitted vocabulary elements are aurally recognizable.

5. In a code to voice inquiry system, vocabulary mechanism comprising a recording medium having a plurality of sound tracks thereon, each sound track having a voice type vocabulary element recorded thereon, a plurality of vocabulary transducers mounted one in operative scanning relation with each of such sound tracks, means driving the vocabulary recording medium relative to the vocabulary transducers at a speed in excess of any at which such recorded vocabulary elements picked up by said vocabulary transducers are aurally recognizable, a multi-unit, two-speed buffer mechanism, each unit thereof comprising a buffer recording medium, drive means for selectively driving each buffer recording medium at a higher and at a slower speed, transducer recording means and transducer pick-up means operatively scanning each buffer recording medium, means responsive to coded impulses for operatively interconnecting successive, selected vocabulary transducers with the transducer recording means of a selected buffer recording medium while the latter is being driven at its higher speed for thereby successively recording on the selected buffer recording medium the respective vocabulary elements scanned by such selected vocabulary transducers, and means for transmitting from the selected buffer medium while the latter is being driven at its slower speed the vocabulary elements thus recorded thereon, the slower speed of the selected buffer medium being such that the vocabulary elements thus transmitted therefrom are aurally recognizable.

References Cited by the Examiner

UNITED STATES PATENTS

| | | | |
|---|---|---|---|
| 1,931,091 | 10/1933 | Smith | 340—152 |
| 1,992,271 | 2/1935 | Williams | 179—2 |
| 2,734,100 | 2/1956 | Kendall | 179—100.2 |
| 2,771,509 | 11/1956 | Dudley et al. | 340—148 |
| 2,821,576 | 1/1958 | Gaubert | 179—100.2 |
| 2,914,752 | 11/1959 | MacDonald | 179—100.2 X |
| 2,968,027 | 1/1961 | McDonnell et al. | 340—172.5 |
| 2,989,594 | 6/1961 | McKaig | 179—100.2 |
| 3,017,610 | 1/1962 | Auerbach et al. | 340—172.5 |
| 3,027,425 | 3/1962 | Tannenbaum et al. | 179—15.55 |
| 3,040,299 | 6/1962 | Crosby et al. | 340—172.5 |
| 3,098,119 | 7/1963 | Lemelson | 178—6.6 |

OTHER REFERENCES 1958, 1959—Publication I: IBM Reference Manual, Ramac 305, copyright by IBM Corp.

1959—Publication II: IBM General Information Manual 709–7090, Data Processing Systems.

March 1961—Publication III: IBM Technical Disclosure Bulletin (vol. 3, No. 10), page 64.

ROBERT C. BAILEY, *Primary Examiner.*

IRVING L. SRAGOW, MALCOLM A. MORRISON, *Examiners.*

L. S. GRODBERG, R. M. RICKERT, *Assistant Examiners.*